United States Patent [19]

Shah et al.

[11] Patent Number: 5,664,117
[45] Date of Patent: Sep. 2, 1997

[54] APPARATUS AND METHOD FOR PREFETCHING DATA TO LOAD BUFFERS IN A BRIDGE BETWEEN TWO BUSES IN A COMPUTER

[75] Inventors: Nilesh Shah; Jasmin Ajanovic; Dahmane Dahmani, all of Folsom, Calif.

[73] Assignee: Intel Corporation, Santa Clara, Calif.

[21] Appl. No.: 603,688

[22] Filed: Jan. 20, 1996

Related U.S. Application Data

[63] Continuation of Ser. No. 201,816, Feb. 24, 1994, abandoned.

[51] Int. Cl.[6] .................................................. G06F 13/00
[52] U.S. Cl. ............................ 395/280; 395/872; 395/308; 370/402
[58] Field of Search ................................ 395/250, 775, 395/800

[56] References Cited

U.S. PATENT DOCUMENTS

| | | | |
|---|---|---|---|
| 3,818,461 | 6/1974 | Ward et al. | 395/250 |
| 3,999,168 | 12/1976 | Findley | 395/110 |
| 4,031,519 | 6/1977 | Findley | 395/110 |
| 4,032,899 | 6/1977 | Jenny | 395/200 |
| 4,052,699 | 10/1977 | Micka | 382/46 |
| 4,075,686 | 2/1978 | Calle et al. | 395/465 |
| 4,189,770 | 2/1980 | Gannon et al. | 395/465 |
| 4,315,312 | 2/1982 | Schmidt | 395/497.03 |
| 4,868,734 | 9/1989 | Idleman et al. | 395/849 |
| 4,882,642 | 11/1989 | Tayler et al. | 360/78.11 |
| 4,965,801 | 10/1990 | DuLac | 371/40.1 |
| 5,075,846 | 12/1991 | Reininger et al. | 364/400 |
| 5,197,144 | 3/1993 | Edenfield et al. | 395/425 |
| 5,224,213 | 6/1993 | Dieffenderfer et al. | 395/250 |
| 5,239,638 | 8/1993 | Pawlowski et al. | 395/425 |
| 5,241,630 | 8/1993 | Lattin, Jr. et al. | 395/525 |
| 5,269,005 | 12/1993 | Heil et al. | 395/275 |
| 5,289,584 | 2/1994 | Thome et al. | 395/325 |
| 5,325,499 | 6/1994 | Kummer et al. | 395/425 |
| 5,333,276 | 7/1994 | Solari | 395/325 |
| 5,392,407 | 2/1995 | Heil | 395/325 |
| 5,410,656 | 4/1995 | King et al. | 395/325 |
| 5,448,310 | 9/1995 | Kopet et al. | 348/699 |
| 5,483,640 | 1/1996 | Isfeld et al. | 395/200.03 |
| 5,522,050 | 5/1996 | Amini et al. | 395/306 |

FOREIGN PATENT DOCUMENTS

| | | |
|---|---|---|
| 0416281A2 | 7/1990 | European Pat. Off. . |
| 0 416 281 A2 | 3/1991 | European Pat. Off. . |
| 0627688A1 | 5/1994 | European Pat. Off. . |
| 0629956A2 | 5/1994 | European Pat. Off. . |
| 0 627 688 A1 | 12/1994 | European Pat. Off. . |
| 0 629 956 A2 | 12/1994 | European Pat. Off. . |

*Primary Examiner*—David Y. Eng
*Attorney, Agent, or Firm*—Blakely, Sokoloff, Taylor & Zafman

[57] ABSTRACT

A bridge circuit providing for efficient data transfer between a first bus and a second bus in a computer system. The bridge circuit receives an address indicating a memory location storing a data segment requested to be transferred from the first bus to the second bus. Fetch circuitry fetches the requested data from the first bus and prefetches one or more additional data segments stored in memory locations sequentially following the memory location storing the requested data. The prefetched data segments are stored in a buffer for immediate access by subsequent data transfer requests. Supply circuitry transfers each data segment from the buffer to the second bus in response to receiving an address corresponding to the particular data segment on the address input circuitry.

28 Claims, 7 Drawing Sheets

APPARATUS AND METHOD FOR PREFETCHING DATA TO LOAD BUFFERS IN A BRIDGE BETWEEN TWO BUSES IN A COMPUTER

This is a continuation of application Ser. No. 08/201,816, filed Feb. 24, 1994, now abandoned.

BACKGROUND OF THE INVENTION

1. Field of the Invention

This invention relates to computer systems, and more particularly, to methods and apparatus for accelerating the transfer of data being read from memory across a bridge joining two buses in a computer system.

2. History of the Prior Art

Historically, personal computers have utilized a single bus to transfer data between different internal components of the system. In personal computers using central processing units such as the 8088, 8086, 80186, 80286, i386™, and i486™ microprocessors designed and manufactured by Intel Corporation of Santa Clara, Calif. (herein referred to as the Intel processors), such buses have typically been designed as either an Industry Standard Architecture (ISA) bus or an Expanded Industry Standard Architecture (EISA) bus. The ISA bus is a sixteen bit data bus while the EISA bus is thirty-two bits wide. Each of these buses functions at a frequency of eight megahertz. The data transfer rates provided by these bus widths and operational frequencies have been found limiting so there have been a number of attempts to increase bus speed.

One recently implemented method of increasing bus speed is to provide an additional, so called, "local bus" which is more closely associated with the central processor than either of the above-mentioned buses and which is capable of running at speeds that more closely approximate the speed at which the processor itself runs. Those system components which require faster operation than has been available using the slower buses (such as an output display card for an output display device) are joined to this faster local bus. However, it is most desirable to be able to continue to utilize those components which were designed to operate with the older buses and which operate at a slower rate. In order to do this, the slower ISA or EISA bus is maintained in essentially unchanged form; and those components which are able to tolerate longer access times are associated with the slower bus. It is then necessary to provide arrangements by which data may be transferred between all of the computer system components. This requires complicated interfacing arrangements. Although the theory behind using a local bus is good, many local bus designs have created conflicts in accessing components which actually slow the operation of the computer.

Intel Corporation has designed a new local bus which may be used in a computer system including other buses such as an ISA bus or an EISA bus (which are hereinafter referred to broadly as secondary buses). This new local bus provides faster throughput of data for selected components of the system without the conflicts which arise using other local bus systems. This new bus is referred to as the "peripheral component interconnect" (PCI) bus. A computer system using this PCI bus includes in addition to the physical PCI bus a first bridge circuit which provides the interface and controls the transfer of data among the PCI bus, the central processing unit, and main memory. A second bridge circuit is also provided as an interface between and a control for the transfer of data between a secondary bus and the PCI bus.

Thus, the arrangement is such that components on the PCI bus transfer data to and receive data from main memory through the first bridge which joins to the central processor and to the main memory; while components on the secondary bus transfer and receive data through the second bridge and through the PCI bus for transfers with components on the PCI bus, and through the first and second bridges and the PCI bus for transfers with the central processor and the main memory.

Various designs of secondary bridges have been proposed. Specific embodiments of such bridges are described in detail in a publication entitled 82420/82430 *PCIset, ISA and EISA Bridges*, 1993, Intel Corporation. The design of these bridges is controlled by various factors relating to the design of each of the PCI and secondary buses. The PCI bus has been designed as a thirty-two bit bus. The PCI bus joins to the central processing unit and main memory through the first bridge circuit which is designed to buffer transfers of data so that a faster processor need not slow to the speed of the bus in transferring data. Similarly, the secondary bridge and each other bridge which is connected to the PCI bus provides buffering so that transfers of data in either direction may be accelerated.

Buffering greatly enhances the speed of data transfer in the computer system. For example, buffering in the first bridge circuit allows a CPU operating at a higher data transfer rate than the PCI bus to store data in the bridge and continue with other operations while the bridge completes the transfer of stored data. Buffering in the second bridge circuit which joins the two buses also offers substantial advantages. For example, when a bus master on a faster bus is trying to write to a slower bus without buffering, the speed of the transfer necessarily slows to the speed at which the slower bus can accept the data. When transferring in the other direction to the faster bus without buffering, the speed of transfer to the faster bus can only approach the speed at which the components on the slower bus are able to transfer data.

However, data buffering in the bridge circuits also poses a number of problems. One problem which has arisen with integrating the newer PCI bus into a computer system with the older secondary buses is that data being read from main memory and transferred across the bridge circuit between the buses is slowed by the need enforced by the PCI protocol to arbitrate for access to the PCI bus with each increment of data transferred. Direct memory access (DMA) devices are used so that the central processor does not have to accomplish all of the individual transfers necessary in a computer system. Typically, a direct memory access (DMA) device resides on the secondary bus and is used to transfer large amounts of data at sequential addresses to or from main memory. Since the primary use of the bridge is to transfer data to and from devices on the different buses, and since main memory lies on the PCI side of the second bridge while all secondary devices lie on the secondary bus side of the bridge, each access of main memory by the DMA device is time consuming. When a DMA device on the secondary bus is reading from main memory, it must arbitrate for the secondary bus, acquire that bus, arbitrate for the PCI bus, acquire that bus, access memory at a first address, read the increment of data (which is typically thirty-two bits) into a bridge buffer, and then read the data from the bridge buffer to its destination. However, because the secondary bridge is not aware of what data the bus master will next require, the bridge as a PCI bus master may either relinquish the PCI bus after each access or continue to wait on the PCI bus until the next DMA access. Since waiting on the bus is a waste of the PCI bandwidth, the bridge relinquishes the bus after each such access. Consequently, the DMA must immediately begin arbitrating for the PCI bus again for the next thirty-two bit increment of data. This process takes an inordinate amount of time. The problem is exacerbated since the DMA device on the secondary bus cannot be forced off the secondary bus until it has completed its operations. This makes it impossible to complete transfers from other PCI masters to the secondary bus while the DMA has access to the secondary bus and slows operations on the PCI bus.

Consequently, it is very desirable to increase the speed of DMA read operations from main memory across the second bridge in a computer system using a PCI bus and a secondary bus.

SUMMARY OF THE INVENTION

It is, therefore, an object of the present invention to increase the speed of DMA read operations from main memory across a bridge providing buffering for data transfers between a PCI bus and a secondary bus in a computer system.

It is another object of the present invention to provide an apparatus and a method for reducing the number of arbitration operations necessary to transfer data across a bridge providing buffering for data transfers between a PCI bus and a secondary bus in a computer system.

It is another more specific object of the present invention to provide apparatus and a method for efficiently and accurately prefetching sufficient amounts of data from memory during any read transfer by a DMA device from main memory across a bridge providing buffering for data transfers between a PCI bus and a secondary bus in a computer system.

These and other objects of the present invention are realized in a bridge circuit adapted to be associated with first and second bus circuits which bridge circuit includes a first path including a plurality of buffers for storing data being read from the first bus to the second bus, a circuit arrangement for reading an amount of data sufficient to fill the storage space in a first line buffer beginning at an address being read, and means for completely filling a next line buffer with data at sequential addresses following the addresses of data placed in the first line buffer if read operations from the first line buffer occur at sequential addresses.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
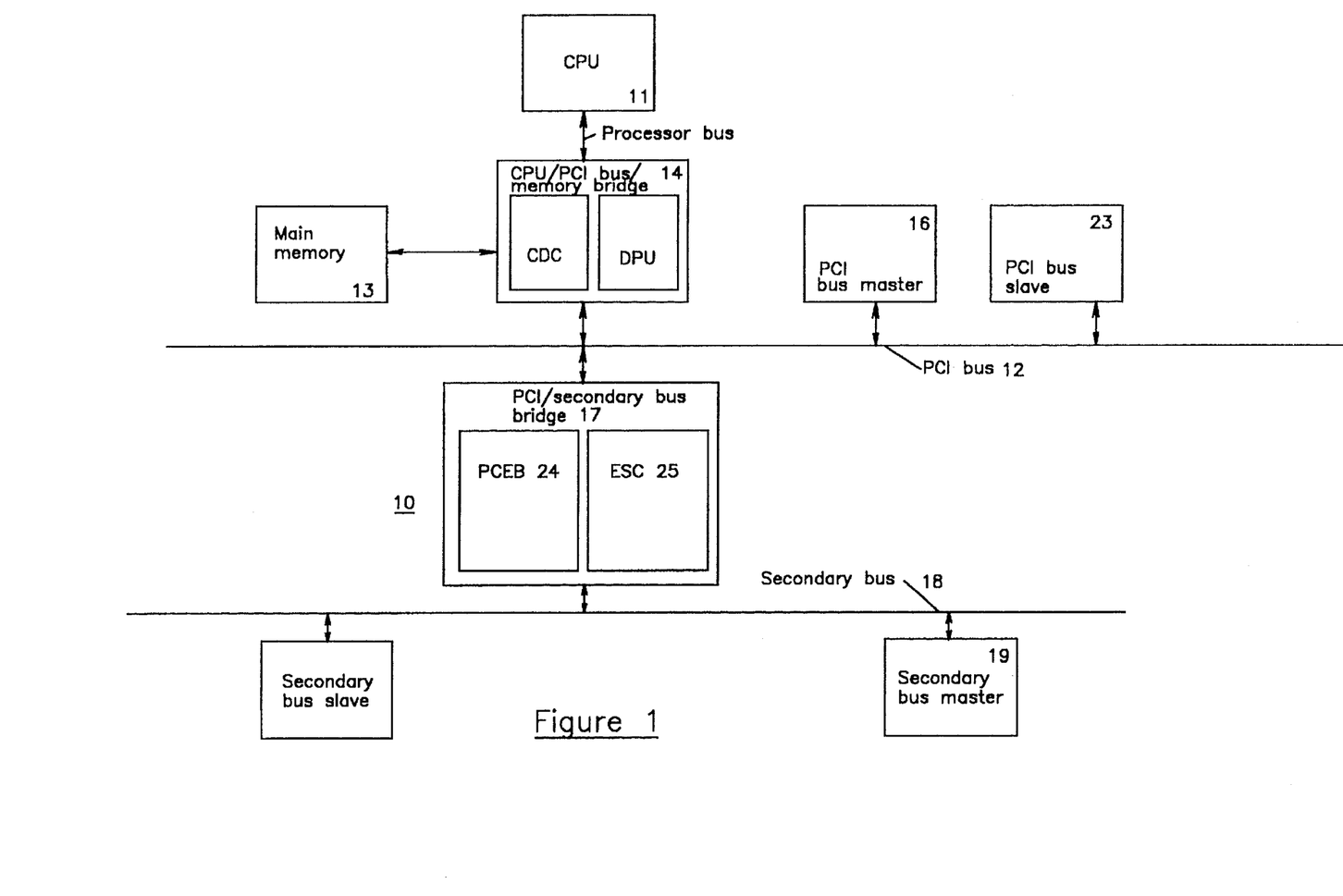
FIG. 1 is a block diagram of a computer system including a plurality of buses including at least a PCI bus and a secondary bus.

Referring now to FIG. 1, there is illustrated a computer system 10. The system 10 includes a central processor 11 such as an Intel i486™ microprocessor which carries out the various instructions provided to the computer 10 for its operations. The central processor (CPU) 11 is joined to a bus 12 adapted to carry information to various components of the system 10. The bus 12 is designed as a PCI bus in order to allow the transfer of data to and from the central processor 11 at a rate faster than is possible with the typical ISA or EISA buses used by the prior art. The processor 11 is joined to the bus 12 by a bridge circuit 14 which is adapted to provide various functions necessary to the transfer of data. Also joined to the PCI bus 12 by the bridge circuit 14 is main memory 13 which is typically constructed of dynamic random access memory (DRAM) arranged in a manner well known to those skilled in the prior art to store information during a period in which power is provided to the system 10. The bridge circuit 14 is physically constructed to include both a cache and (DRAM) controller (CDC) chip and a data path unit (DPU) chip each of which is manufactured by Intel Corporation of Santa Clara, Calif. Detailed descriptions of these chips are provided in *Cache & DRAM Controller*

(*CDC*) 82424TX and *Data Path Unit* (*DPU*) 82423TX, each published by Intel Corporation.

The bridge 14 includes circuitry for interfacing the central processor 11 and main memory 13 to the bridge 14, circuitry for interfacing the bridge 14 to the PCI bus 12 as either a bus master or a bus slave, and cache control and data synchronization circuitry. In general, the bridge circuit 14 includes circuitry for controlling and accomplishing the transfer of data among the central processor 11, main memory 13, and the PCI bus 12. Among the circuitry included in the bridge 14 and specifically in the data path unit are a number of buffer circuits which may store data being transferred among the central processor 11, main memory 13, and the PCI bus 12. As has been set out above, the buses historically used with Intel microprocessors in computer systems (ISA and EISA buses) do not run as fast as is desirable. For this reason, the new PCI bus has been designed to run at a speed closer to the speed of the processors. A faster data transfer rate has been accomplished by utilizing a bus width of thirty-two bits, by allowing operations at increased frequencies, and by buffering data transfers. Buffering has been provided in the bridge circuit 14 so that a CPU 11 operating at a higher data transfer rate than the PCI bus 12 may store data in the bridge and continue with other operations while the bridge completes the transfer of stored data. This buffering of data greatly improves the speed of data transfer in the computer system 10.

Also connected to the PCI bus 12 is a PCI bus master circuit 16 which may be one of a number of different component circuits. The main properties of a PCI bus master are that it includes a microprocessor or controller which functions at some internal clock rate and that it may initiate and control operations on the PCI bus 12. A PCI slave circuit 23 may also be connected to the PCI bus 12. Such a PCI slave circuit 23 may be, for example, a video output card having a frame buffer adapted to store video signals to be transferred to an output device such as a monitor for display.

Also connected to the PCI bus 12 is a PCI/secondary bus bridge circuit 17. The bridge circuit 17 performs the various functions necessary to transfer data between the PCI bus 12 and a secondary bus 18 so that the data may be used by various component circuits joined to the secondary bus. The secondary bus 18 may be an ISA bus, an EISA bus, or a similar bus, any of which typically transfers data at a rate slower than the bus 12. One specific PCI to secondary bridge circuit 17 used with an EISA secondary bus includes a pair of integrated circuit chips referred to respectively as a PCI/EISA bridge (PCEB) 24 and an EISA System Controller (ESC) 25. These integrated circuit chips are manufactured by Intel Corporation and are described in detail in the publication entitled 82420/82430 *PCIset, ISA and EISA Bridges*, referred to above. In general, the PCEB chip 24 includes circuitry for transferring data between the two buses, while the ESC chip 25 includes circuitry for controlling access to the secondary bus.

Such a bridge 17 includes circuitry for providing the interface between the PCI bus 12 and the secondary bus 18 so that data may be transferred therebetween. Among this circuitry are a number of data buffers adapted to store data being transferred between the two buses. To facilitate the data transfer, the bridge 17 provides circuitry generally in the PCEB chip 24 which allows it to operate as an intercoupling bus master or a bus slave on the PCI bus 12. The bridge 17 also provides circuitry generally in the ESC chip 25 which allows it to operate as a bus master or a bus slave on the secondary bus 18. The ability of the bridge 17 to act as a PCI bus master and a secondary bus slave allows a bus master circuit 19 positioned on the secondary bus 18 (for example, local area network circuitry) to gain access to the PCI bus 12 and then to the main memory or other components joined to the PCI bus 12. The ESC chip 25 also includes various other circuits typically used in Intel processor-based computer systems. For example, the ESC chip 25 may include interrupt controllers, a first arbiter circuit for controlling access to the PCI bus 12, and a second arbiter circuit for controlling access to the secondary bus 18.

As described above, buffering is provided in the bridge circuit 17 (as well as in the bridge circuit 14) to store data being transferred between the PCI bus and the secondary bus. Buffering in the bridge circuit 17 which joins the two buses 12 and 18 offers substantial advantages. For example, when a faster bus is trying to write to a slower bus without buffering, the speed of the transfer necessarily slows to the speed at which the slower bus can accept the data. When transferring in the other direction without buffering, the speed of transfer to the faster bus can only approach the speed at which the components on the slower bus are able to transfer data.

As is illustrated in FIG. 1, the PCI bus has been integrated into computer systems along with the older buses so that components designed for the older buses may continue to be used. Moreover, when operating with these older buses, the PCI bus and its interfacing circuitry must be adapted to allow, as well as possible, the operations on the older buses to continue at their best speed. A number of problems have arisen in attempting to integrate buses designed with substantially different characteristics into the same computer system. For example, the PCI bus is designed so that a number of bus masters may access the bus. By using the buffering facilities, a bus master may store data in the bridge buffers and continue with other operations while the bridge circuits accomplish the transfer of data to its final destination. Retry facilities are provided to enhance the use of the PCI bus by allowing a bus slave to require a bus master to retry an access when the slave cannot comply in order to prevent PCI bandwidth waste.

On the other hand, the secondary buses and components which join thereto were designed so that a bus master which gains access to the secondary bus retains control of that bus until it has completed its operations and then relinquishes the bus to some other component. Operations on either EISA or ISA type secondary buses are much slower than those on the PCI bus. So long as secondary bus masters are only transferring data on the secondary bus, this is not a problem. However, a DMA device will often need to read or write large amounts of data from or to main memory. To do this, the secondary bus master must use the abilities of the bridge 17 as a PCI bus master to gain access to the PCI bus 12. However, since operations on the secondary bus are relatively slow and, because a bus master on the ISA and EISA buses cannot be forced off the bus until it has completed its operations, once a bus master on the EISA bus owns the EISA bus, it precludes other uses of the bridge and the EISA bus. For this reason it is desirable to allow a secondary bus master which has access to the secondary bus to complete its operation as soon as possible so that the bus will be available.

One problem which has arisen with integrating the newer PCI bus into a computer system with the older secondary buses is that data transfers across the bridge circuit 17 are slowed by the need forced by the PCI protocol to arbitrate for access to the PCI bus 12 with each portion of data transferred. Since the primary use of the bridge 17 is to transfer data to and from main memory 13, and since main memory 13 lies on the PCI side of the bridge 17 while all secondary devices lie on the secondary bus 18 side of the bridge 17, each access of main memory 13 is time consuming.

This is especially true of DMA transfers since a DMA device on the secondary bus 18 cannot be forced off the secondary bus 18 until it has completed its operations. As will be understood, DMA devices are used in order to relieve the central processor 11 of the need to accomplish all of the individual data transfers necessary in a computer system. One of the primary uses of a DMA device is to read from main memory 13 to some device on the secondary bus 18. The DMA device is typically given a memory address by the central processor 11 and an amount of data to be transferred, and proceeds to transfer the amount of data specified beginning at the specified address. The DMA device generates a series of sequential addresses and accesses each of those addresses to read the data. Thus, when a DMA device on the secondary bus 18 is reading from main memory 13, it must arbitrate for the secondary bus 18, acquire that bus, arbitrate for the PCI bus, acquire that bus, access memory 13 at a first address, read the data into a bridge buffer, and then read the data from the bridge buffer to its destination. However, in order not to waste PCI bandwidth by waiting on the bus, the bridge 17 as a PCI bus master relinquishes the PCI bus 12 after each read access. Consequently, the DMA device is forced to re-arbitrate for the PCI bus 12 after each read access for the next increment of data. This process takes an inordinate amount of time. The present invention overcomes the need to arbitrate for the PCI bus 12 with every read transfer from main memory by providing circuitry and a method for efficiently and accurately fetching larger mounts of data with certain accesses of main memory 13. For example, the invention looks at the accesses which have been accomplished, and when those accesses appear to predict that a series of sequential accesses are involved, then a next access fetches a plurality of increments of data in sequential order rather than simply one increment of data. This drastically reduces the time required to access main memory 13 for reads and increases the transfer speed using the bridge 17. Increasing this transfer speed increases the overall speed of operation of the computer system. Other aspects of the invention are utilized to increase the accuracy of predicting whether sequential data is being accessed so that loading buffers with useless data occurs as infrequently as possible.

Figure 2:
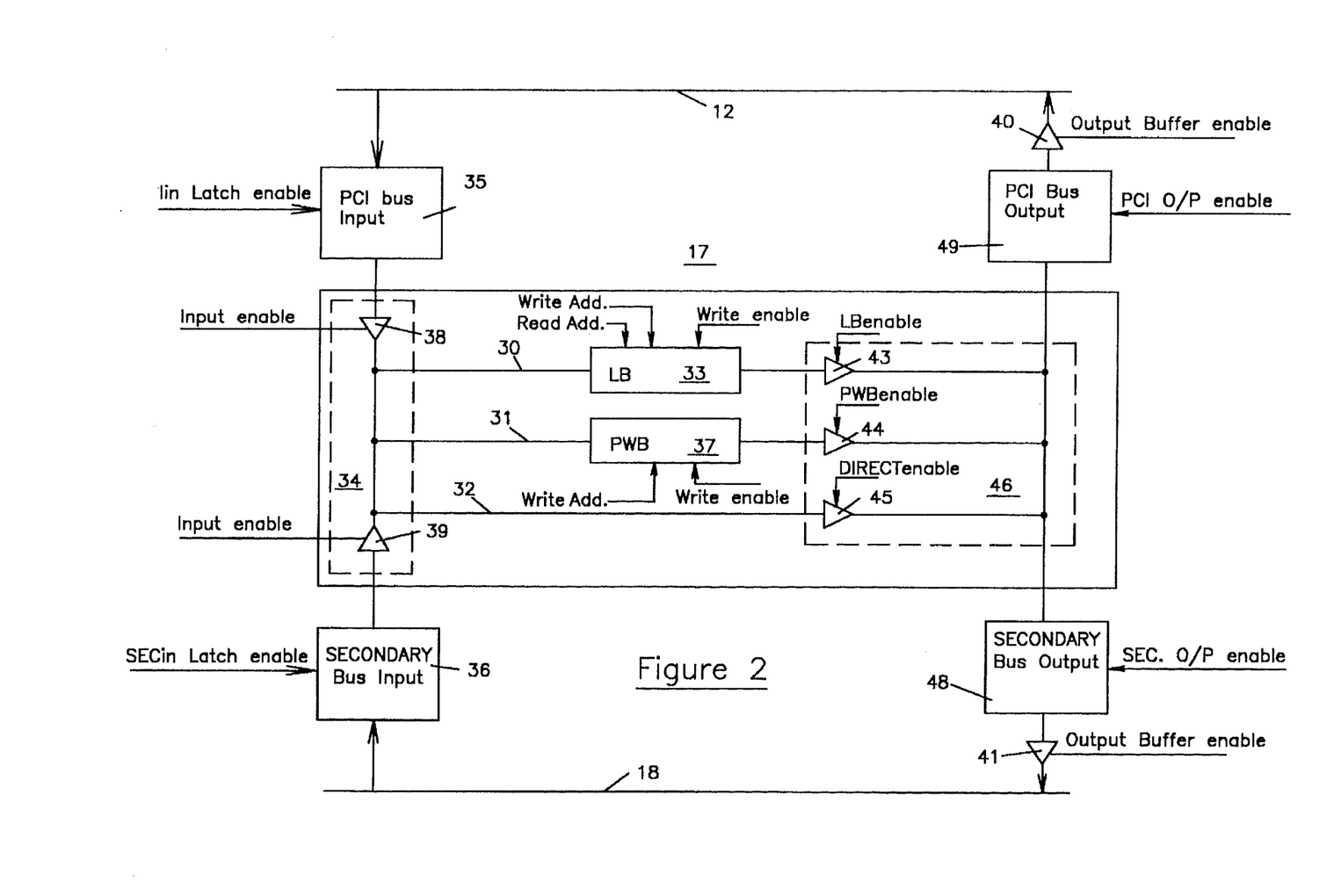
FIG. 2 is a block diagram of a data transfer portion of a bridge circuit for connecting a PCI bus and a secondary bus in accordance with the present invention.

Referring now to FIG. 2, there is illustrated a block diagram of one embodiment of data transfer circuitry in a bridge circuit 17 which is designed in accordance with the present invention to accomplish the transfer of data between the two buses 12 and 18 of the computer system 10. It should be noted that in one embodiment of the bridge circuit 17 with which the present invention is utilized an essentially identical address transfer portion is utilized for transferring addresses between the buses 12 and 18. From this point on, the description may be considered to explain the operation of both data and address transfer portions. The data transfer circuitry of the bridge circuit 17 includes three individual paths which may transfer data between the PCI bus 12 and a secondary bus 18. The first of these three paths 30 includes a line buffer 33 (a plurality of individual buffers in one embodiment) in which data may be stored which is being transferred during read and write operations. Typically, data is stored in the line buffer when a read transfer is being accomplished from the faster to the slower bus (i.e., when the slower secondary bus is reading from the PCI to the secondary bus) or when a write operation is being accomplished from the slower to the faster bus. The second path 31 includes a posted write buffer 37 in which data being written from the faster to the slower bus is typically stored. The third path is essentially a direct connection 32 for information which need not (or may not) be stored during transfer between the buses. This third path 32 allows data to be taken directly from memory and transferred to the secondary bus without buffering.

Each of these three paths is connected to receive input data transferred by a multiplexor 34. In the embodiment of the circuitry shown, the multiplexor 34 is represented by a pair of tristate devices 38 and 39 which may be enabled to allow input from either of the two buses. The multiplexor 34 receives input signals from input latches 35 and 36 connecting to each of the two buses 12 and 18 under control of enabling signals furnished when a particular bus master gains access to the bus and the bridge circuitry. Only one of the two buses may transfer signals at any instant. Consequently, only one of the inputs to the multiplexor 34 from the latches will be selected at any time. Each of the three paths is also connected to provide outputs to a pair of output buffer circuits 40 and 41 which may be enabled to transfer the data to either the secondary bus 18 or the PCI bus 12. Consequently, any amount of data may be sent from either the PCI bus or the secondary bus to the other one of the two buses through any of the paths without having to transit any significant circuitry or gating which might impose significant clock delays on the transfer.

As may be seen in the embodiment shown, each of the three paths includes a tristate device 43, 44, or 45 (together forming a multiplexor 46) which when enabled allows the transfer of addresses or data through that particular path from the sending bus to the receiving bus. Each of the two paths which includes storage buffers 33 or 37 also includes circuitry for furnishing control signals to enable that buffer so that the correct storage buffer and path may be selected for the particular read and write operation which is taking place.

Figure 3:
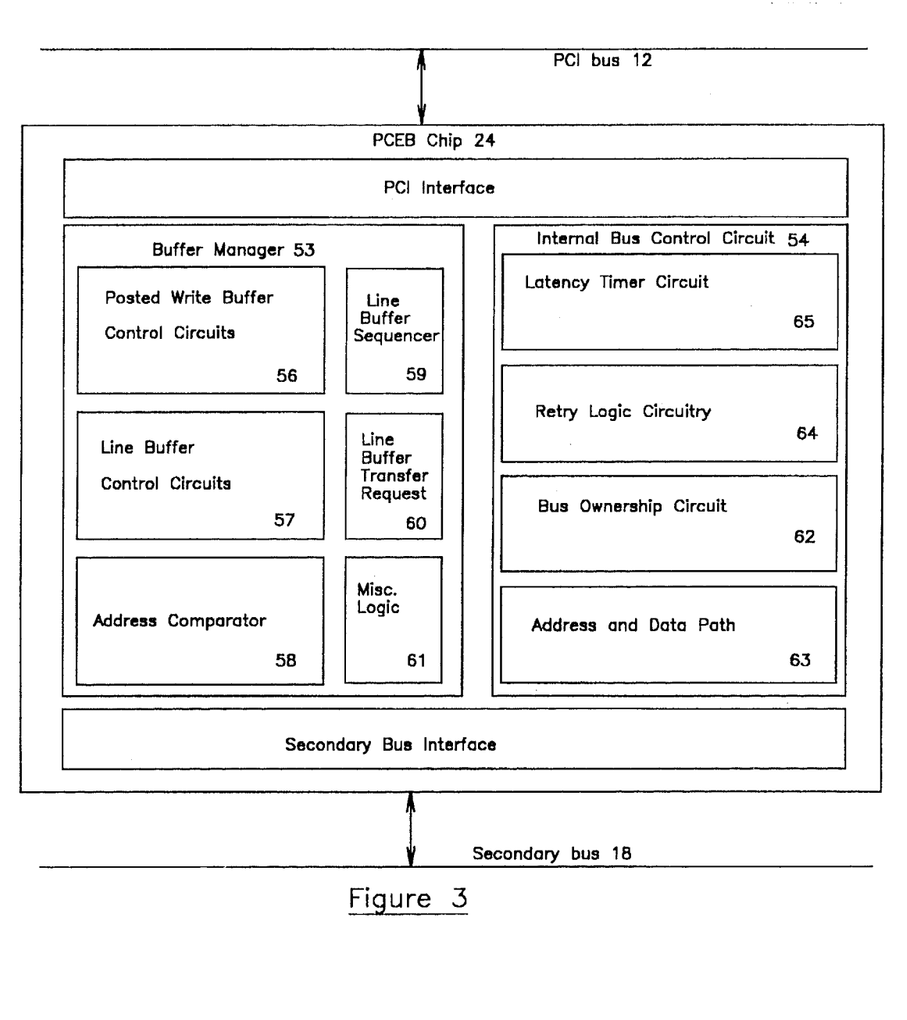
FIG. 3 is a block diagram of a control portion of the bridge circuit illustrated in FIG. 1 for connecting a PCI bus and a secondary bus in accordance with the present invention.

FIG. 3 illustrates a functional block diagram of the control circuitry of the PCEB chip 24 of the bridge circuit 17. As may be seen in FIG. 3, PCI interface circuitry is arranged to provide an interface for transferring data and addresses to and from the PCI bus 12. In a similar manner, secondary bus interface circuitry is arranged to provide an interface for transferring data and addresses to and from the secondary bus 18 (e.g., an EISA bus). Within the PCEB chip 24 are arranged a buffer manager circuit 53 and an internal bus control circuit 54. The buffer manager 53 includes control circuitry 56 including state machines for causing the operation of posted write buffers 37; control circuitry 57 including state machines for causing the operation of line buffers 33; address comparator circuitry 58 for controlling selection of particular buffers and bytes, word, and double word portions of individual buffers; a line buffer sequencer 59 which aids in controlling sequencing through the individual portions of the line buffer 33; a line buffer transfer request circuit 60; and various miscellaneous logic 61. The internal bus control circuitry 54 includes a bus ownership control logic circuit 62 which incorporates logic including state machines for controlling and determining at any time the ownership of the various data paths through the PCEB chip 24. The circuitry 54 also includes the address and data paths 63 including the physical line buffers 33 and posted write buffers 37 illustrated in FIG. 2 above. A retry logic circuit 64 with a number of state machines which track the status of the various components of the bridge 17 and the condition of the buses 12 and 18 and an EISA latency timer circuit 65 are also a part of the internal bus control circuit 54.

Figure 4:
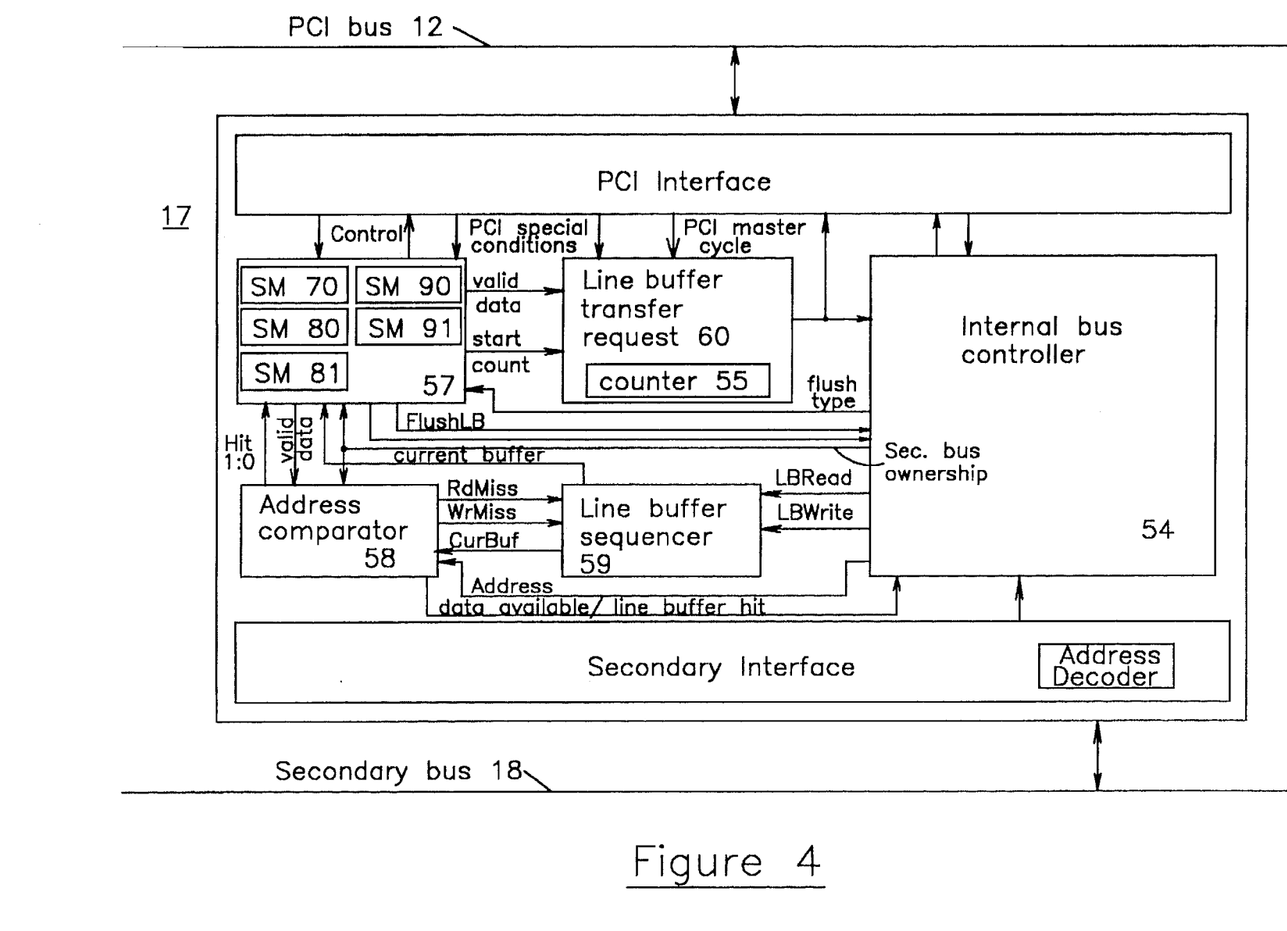
FIG. 4 is a more detailed block diagram of a portion of control circuitry illustrated in FIG. 3 used in carrying out the invention.

Referring now to FIG. 4, there is illustrated a block diagram of that portion of the bridge circuit 17 used to accomplish the present invention. The circuitry includes the internal bus controller 54 which includes the various circuitry discussed above for accomplishing the operations of managing the line buffers 33 in the PCEB chip 24 of the bridge 17. The line buffer control circuit 57 receives control signals from other portions of the bridge circuitry and controls the actual operations by which data is transferred into the line buffers 33 and read therefrom during a read from main memory to the secondary bus. A counter circuit 55 which is a portion of the line buffer transfer request circuit 60 is arranged to store a count of the number of data doublewords which are to be read into a line buffer during a read transfer from the PCI bus in order to speed the read transfer operation. The counter circuit 55 provides a count to the PCI interface circuit which indicates the number of doublewords to be read from a device on the PCI bus and transferred to the particular line buffer 33 which is currently being used for transferring the data being read.

The internal bus controller 54 transfers signals to the PCI interface circuitry, the secondary bus interface circuitry, the line buffer control circuit 57, the line buffer sequencer 59, and the address comparator 58. The line buffer sequencer 59 receives signals from the address comparator 58 indicating an address hit or miss and provides to the address comparator a next line buffer in the sequence of individual line buffers 33 for reading data each time a buffer is read. The address comparator 58 compares the most significant bits of the address on the secondary bus 18 with the current line buffer address stored in the line buffers 33 to determine whether data is stored in the current line buffer. The address comparator 58 uses the signals from the line buffer sequencer 59 to transfer control signals to the line buffer control circuit 57 pointing to the appropriate individual line buffer for reading the current data.

Figure 5:
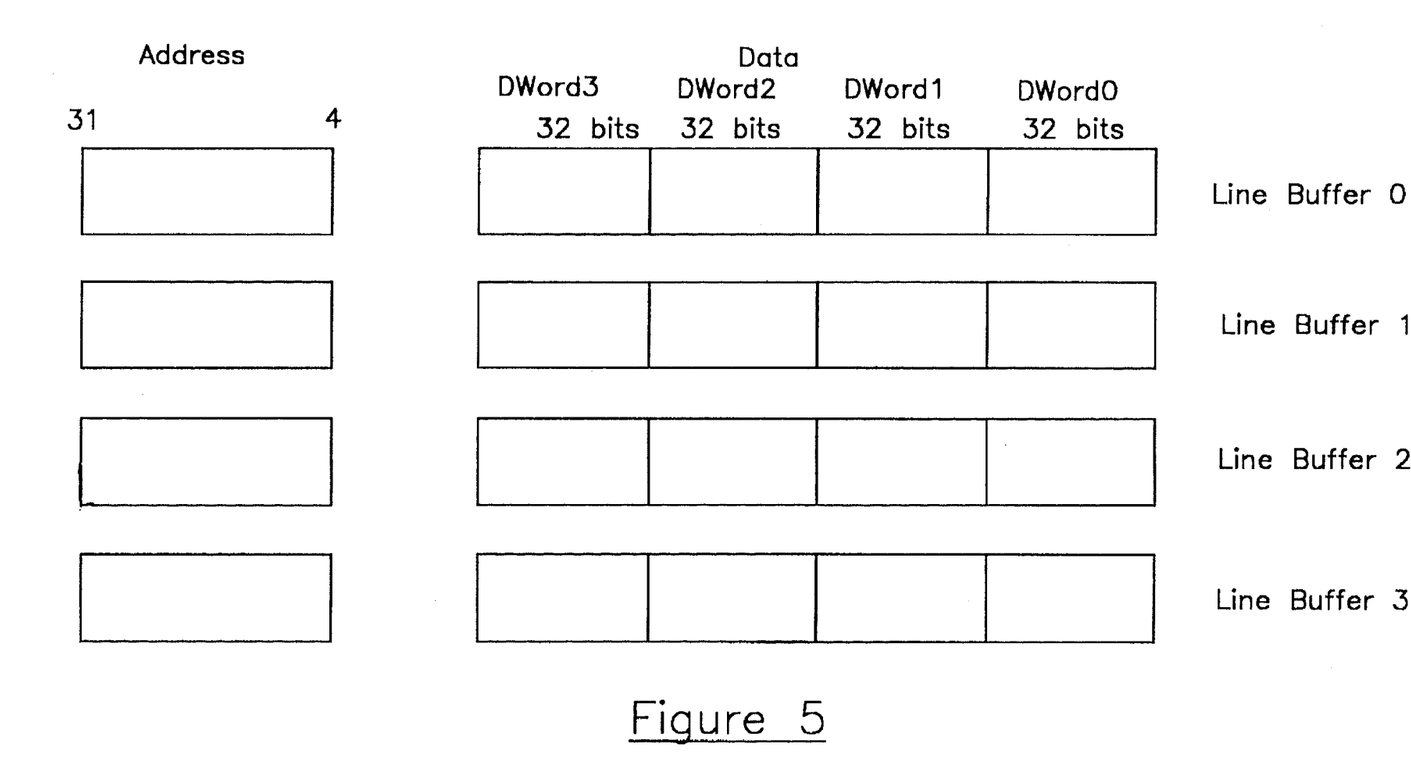
FIG. 5 is a diagram illustrating the arrangement of one embodiment of line buffers in the data transfer portion of a bridge circuit such as that illustrated in FIG. 2.

FIG. 5 illustrates one arrangement of line buffers 33. This arrangement represents both the data line buffers 33 and their associated address line buffers discussed above. The arrangement includes four individual data line buffers 0–3 (LB0–LB3) each capable of storing four doublewords of thirty-two bits each. Thus, the entire line buffer arrangement provides storage for a total of sixteen doublewords of data. As will be understood, when data is read from main memory by a DMA device on the secondary bus 18 for transfer to a device on the secondary bus, the data is typically addressed and transferred one doubleword at a time. As set out above, when a DMA device reads from memory, it generates a series of sequential doubleword addresses and accesses each of those addresses to read the data. Thus, when a DMA on the secondary bus is reading from main memory, it must arbitrate for the secondary bus, acquire that bus, send the first address to the bridge, arbitrate for the PCI bus, acquire that bus, access memory at the first address in the sequence, read the data into one of the line buffers, and then read the data from the line buffer to its destination. However, in order not to waste PCI bandwidth, heretofore, the bridge 17 as a PCI bus master has been required to relinquish the PCI bus after each read access. Consequently, the DMA has been forced to continuously arbitrate for the PCI bus for each individual increment of data.

In order to reduce the number of arbitrations necessary on the PCI bus 12, the circuitry of the bridge 17 which controls the transfer of data being read accesses sufficient data on each initial read of main memory to fill the entire remaining portion of a line buffer beginning at the point of the initial doubleword address. Thus, for example, if a read is from an address which would be placed in the second doubleword (DW1) of the line buffer LB0 in FIG. 5, then three doublewords at sequential addresses in memory beginning at the initial address are accessed and transferred in a burst transfer to the three spaces for storing doublewords DW1–DW3 of the line buffer LB0. If the first addressed doubleword would be stored in the line buffer LB0 at doubleword DW0, the four doublewords DW0 through DW3 are accessed in memory and placed in the line buffer LB0. If the first addressed doubleword would be stored in the line buffer LB0 at doubleword DW2, two doublewords are accessed and placed in the line buffer LB0 at doublewords DW2 and DW3. Any of these accesses requires only a single arbitration for the bus 12 and thus reduces the access time substantially for the total data transferred.

Then, after this first fill of the first line buffer LB0, the circuitry of the bridge controlling the transfer looks at the read accesses actually accomplished by the secondary bus master on the data stored in the first line buffer LB0. The line buffer control circuit 57 includes circuitry which looks for sequential accesses by the secondary bus master of the data in the line buffers 33. If sequential accesses are detected, then the line buffer control circuit 57 generates signals which cause the next four doublewords in memory to be read in order to fill the entire next line buffer LB1. This provides in a single arbitration four additional doublewords of data which are immediately available to be read by the secondary bus master. This also greatly speeds the transfers of data being read from memory.

The circuitry which controls the prefetch operation by which a sequence of accesses of sequential data initiates a transfer of an entire line from memory to the line buffers includes circuitry which detects the presence of randomness. If randomness is detected, then the prefetch of an entire next line is not begun. This facility helps eliminate the load on the bridge circuitry which is required when prefetched data is not required by the secondary bus master.

One embodiment of the invention also includes circuitry in the line buffer control circuit 57 which monitors the reading of data from the second line buffer LB1 after the data in the first line buffer has been read to the secondary bus and, if those reads indicate that probable sequential accesses will continue, generates signals which cause the next four doublewords in memory to be read in order to fill the entire next line buffer LB0.

In order to accomplish read transfers in accordance with the present invention, only two line buffers LB0 and LB1 are utilized. Only two line buffers are necessary although the embodiment illustrated includes four line buffers (which are used during write transfers from the secondary bus to main memory) because the secondary bus 18 transfers data at a much slower rate than does the PCI bus 12. The decisions of the amount of data to transfer to the individual line buffers are made using a number of state machines which reside in the line buffer control circuit 57. Referring back to FIG. 4, the first of these state machines herein referred to as an "LB0 Read" state machine 70 controls the loading of the first of the two line buffers with data sufficient to fill the buffer beginning at the doubleword chosen by the address of the data being read. A second state machine referred to as "LB1 Prefetch state machine" 91 controls the transfer of four doublewords of data to the second line buffer LB1 if the data in line buffer LB0 is being read in sequence. A third state machine referred to as "LB0 Prefetch state machine" 90 controls the transfer of four doublewords of data to the first line buffer LB0 if the data in line buffer LB1 is still being read in sequence. This state machine is essentially identical to the LB1 prefetch state machine 91. Fourth and fifth state machines referred to as the "LB0 Supply" state machine 80 and "LB1 Supply" state machine 81 assists the other state machines by transferring data from the line buffers to the secondary bus and providing data by which determinations of the two prefetch state machine are made. All of these state machines reside in the line buffer control circuit 57.

The basic operation of the circuit of FIG. 4 in response to a read request of main memory by a secondary bus master is as follows. It will be presumed that a secondary bus master has gained access to the secondary bus and is ready to read data from the PCI bus 12. To accomplish this, the secondary bus master would typically perform the following operations. A secondary bus master gains access to the secondary bus by a secondary bus arbitration. The bus master then asserts an address at which data is to be read on the bus 18 and shortly thereafter furnishes control signals indicating that the operation is to start, whether the operation is a read or a write operation, and whether the operation is an input/output cycle or a memory cycle. In the present case, the signals would indicate a memory read cycle. The address is decoded at the secondary bus interface of the PCEB chip 24, and a determination is made whether the bridge 17 is the secondary bus slave which is being addressed.

When the bridge 17 is being addressed to read from main memory, the internal bus controller 54 generates signals indicating a line buffer read cycle and transfers the address to the address comparator 58 which determines whether the data desired is available in the two line buffers 33 used for read operations by looking for that address in the address line buffers. To accomplish this, the address comparator 58 goes to the line buffer which the sequencer 59 points to as current. After each completed ownership change on the secondary bus, the line buffers 33 are marked invalid, and the sequencer 59 is reset to point to line buffer LB0 as the current line buffer. Consequently, at the beginning of any new read transfer from the PCI bus using the line buffers, the address comparator 58 will compare the address on the secondary bus with the address in the line buffer LB0, will determine that the line buffers 33 are all empty, and will notify the internal bus controller 54 of a read miss. This indicates to the internal bus controller 54 that it should signal the secondary bus interface to hold the secondary bus master in wait states until the data is available in the line buffers 33.

The generation of a read miss on a read cycle after a change of ownership of the secondary bus initiates the operation of the LB0 Read state machine 70. This state machine initiates a "line fetch" process. The line fetch process is that discussed above in which a sufficient number of doublewords are read from memory in a single arbitration to fill the spaces in the line buffer LB0 beginning at the point of the first doubleword addressed through the end of the line buffer. The number of doublewords to be read and the starting doubleword address are both determined from bits 3:2 of the thirty-two bit address placed on the secondary bus to be read. If bits 3:2 are "00," the initially addressed doubleword is to be placed in the doubleword 0 of the line buffer LB0 and four doublewords are to be accessed. If bits 3:2 are "01," the initially addressed doubleword is to be placed in the doubleword 1 of the line buffer LB0 and three doublewords are to be accessed. If bits 3:2 are "10," the initially addressed doubleword is to be placed in the doubleword 2 of the line buffer LB0 and two doublewords are to be accessed. If bits 3:2 are "11," the initially addressed doubleword is to be placed in the doubleword 3 of the line buffer LB0 and a single doubleword is to be accessed. The number of doublewords to be transferred is placed in the counter circuit 55 in the line buffer transfer request circuit 60 by the state machine 70 to represent the number of doublewords to be read into the line buffer LB0.

The request to read from PCI memory is passed to the PCI interface circuitry which arbitrates for access to the PCI bus 12. The number of doublewords to be transferred is also sent to the PCI interface from the counter circuit 55 as a part of this request. When access to the PCI bus 12 is obtained, the doubleword of data at the address being read is placed in the first line buffer LB0 at the addressed doubleword space and marked valid. When this first doubleword requested by the secondary bus master is placed into the line buffer LB0 at the specified doubleword space, the next read access by the secondary bus master which has been waiting on the secondary bus will cause the address comparator 58 to determine a hit since the addressed data and the most significant twenty-eight bits of its address are stored by the line buffer LB0. The hit triggers the operations of the supply state machine 80 by which the data is read by the secondary bus master. As the first doubleword of data is read to the secondary bus, the bytes of data held in the doubleword are marked invalid so that they will not be accessed a second time. The hit is passed by the internal bus controller 54 to the secondary bus interface which initiates the next bus cycle by the secondary bus master on the secondary bus.

When the hit is registered and while the supply state machine 80 of the bridge 17 begins providing data to the secondary bus master, the LB0 Read state machine 70 continues bringing in the rest of the data to fill the particular line buffer LB0 from the initial address in memory indicated by the bits 3:2 of the address. As each additional doubleword is brought into the line buffer, the value in the counter 55 of the transfer request circuit 60 pertaining to the line buffer LB0 is decremented until the line buffer LB0 is full. At the same time, the supply state machine 80 continues to furnish data to the secondary bus until the first doubleword has been furnished. This takes some time because the bus 18 operates at a slower speed than the bus 12 is able to fill the line buffers 33. Moreover, those skilled in the art will recognize that this read operation on the secondary bus may take place in word or byte increments and so may require some substantial period.

When the first doubleword has been furnished to the bus master, the bus master asserts the second address on the secondary bus. This address is furnished to the secondary bus interface and sent to the address comparator 58. The address comparator 58 compares the highest valued bits of this address with the address in line buffer LB0. If the addressed data is part of the data held in the line buffer LB0, a read hit is registered since the high order bits of the address are in the associated address line buffer. If this hit is on a doubleword in a sequence indicating that sequential reads are probable and the LB0 Read state machine 70 has completed filling the line buffer LB0, the LB1 prefetch state machine 91 begins. This state machine 91 initiates a new arbitration for the PCI bus 12, increments the beginning address used for fetching the first data to an address for a new line of data using the original count in the portion of the counter 55 related to line buffer LB0, places a count of four in a portion of the counter 55 related to line buffer LB1, and ultimately causes the transfer of the next four doublewords of data in the sequence of doublewords beginning at the initial address into the next line buffer LB1.

In order to determine whether the data is in sequence, the LB1 prefetch state machine 91 obtains the doubleword address of the first doubleword read by the secondary bus master from the supply state machine 80. If the next doubleword address provided by the supply state machine 80 is the next address in sequence, then a prefetch is begun. If the next doubleword is not in sequence, the prefetch is aborted. For example, a read of the first doubleword 0 followed by a read of the doubleword 1, a read of the doubleword 1 followed by a read of the doubleword 2, or a read of doubleword 2 followed by a read of the doubleword 3 each start the prefetch operation. In one embodiment, a byte read by the secondary bus master (except for a byte read across a doubleword boundary), even though in sequence does not initiate a prefetch operation because byte reads occur so slowly that there is no reason to go ahead with the prefetch when the secondary bus master may have as many as sixteen individual read operations to accomplish before more data is needed. In this manner, a prefetch is undertaken only when the reads clearly suggest a pattern of sequential reads of sufficient data to make a prefetch useful.

The LB1 prefetch state machine 91 is replicated for the line buffer LB0. Thus, when two doublewords are read in sequence from line buffer LB1, the LB0 prefetch state machine 90 starts a prefetch of four doublewords to line buffer LB0. The operation continues in this manner so long as doublewords are accessed sequentially. In this manner, the number of arbitrations required for the transfer of data read through the bridge from memory on the PCI bus 12 is drastically reduced and the speed of transfer is greatly accelerated.

Figure 6:
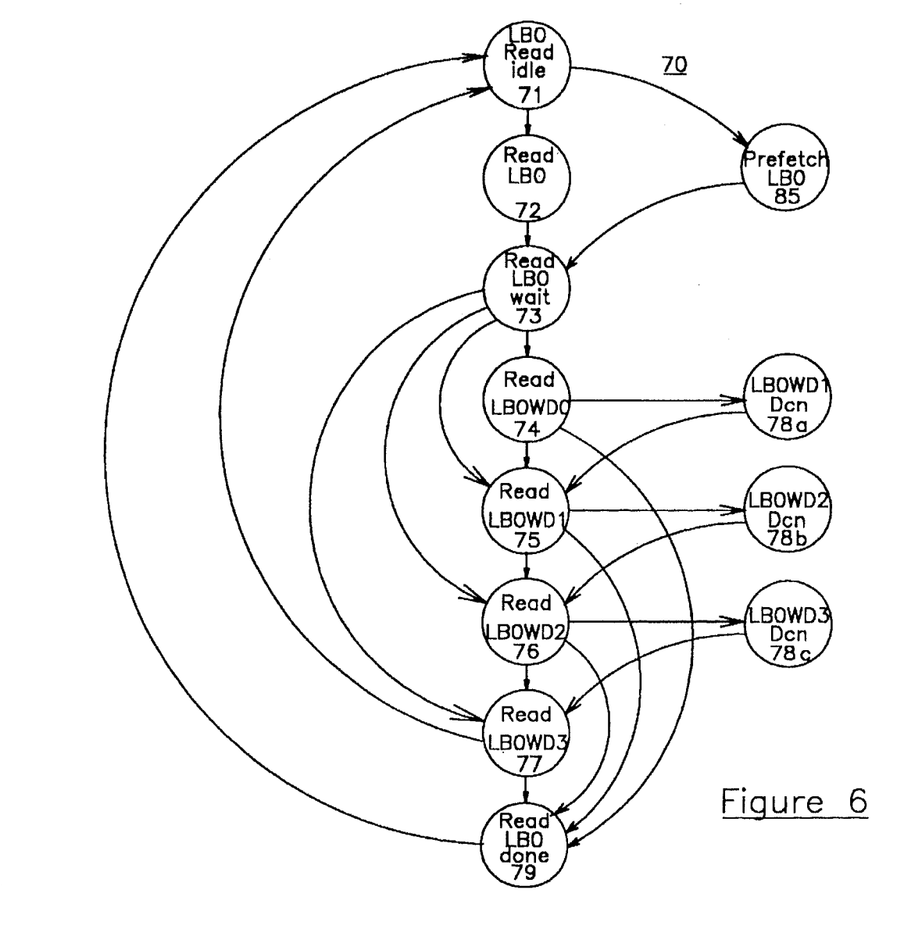
FIG. 6 is a diagram describing the operative states of a first state machine utilized in implementing the invention.

Referring now to FIG. 6, there is illustrated an LB0 Read state machine 70 used to cause a line fetch of data for the first line buffer LB0. As may be seen, the state machine 70 normally rests in a first idle condition 71. The state machine 70 moves from the state 71 to a state 72 in response to indications that a read line buffer cycle during a valid address comparison has generated an address miss in both line buffers LB0 and LB1, that there is no indication that line buffer LB1 is prefetching or will be prefetching, and that no line buffers are being flushed. A line fetch operation for buffer LB0 cannot be accomplished when a prefetch has been set up for the line buffer LB1 nor when write data is being cleared from the other line buffers. Consequently, the state machine will not move to the state 72 until these conditions are satisfied.

In state 72, the LB0 Read state machine 70 latches the address on the secondary bus into the address line buffer LB0 for comparison with addresses furnished for additional reads by the secondary bus master. The state machine 70 also requests the PCI interface to conduct an arbitration for the PCI bus 12 and loads the counter 55 of the transfer request circuit 60 with the number of doublewords to be moved to the line buffer LB0. The state machine 70 then transitions to a wait state 73. If there is no prefetch of LB0 or LB1 and the request for the PCI bus is active, the state machine 70 moves from the wait state 73 to a state 74 if the doubleword 0 (determined from address bits 3:2) is to be read, to a state 75 if the doubleword 1 is to be read, to a state 76 if the doubleword 2 is to be read, and to a state 77 if the doubleword 3 is to be read. In each of these states 74-77, the LB0 Read state machine 70 latches the data for the selected doubleword into the appropriate doubleword space of the line buffer LB0 and marks the data as valid.

The valid indication is provided to the LB0 supply state machine and the address comparator. In response to the valid indication, the address comparator 58 registers a hit and turns on the LB0 supply state machine to begin furnishing the data to the secondary bus master. So long as the condition by which the state 74-76 was entered remains true, when the doubleword has been read for the particular state, the LB0 Read state machine 70 then transitions to the next sequential step 75, 76, or 77. The state machine 70 continues through the states 75-77 until the LB0 is filled.

In any of the states 74-77, the state machine may instead move to a disconnect state 78 if the PCI bus has signaled a disconnect or has put the bridge in a wait state, or if the maximum time for the secondary bus operation has expired. If the PCI has placed the bridge 17 in a wait state, then the state machine 70 may transition to the next of the states 75-77 once the wait has been completed. From each of the states 74-77, the state machine may also move to a state 79 in which the operation is aborted. The state machine 70 also moves to the read complete state 79 when the read of the line buffer LB0 is complete. The state machine 70 moves back to the idle state 71 whenever there is a change of ownership of the secondary bus, whenever the bus master wants to write using the bridge 17, and whenever there is an address miss in both line buffers LB0 and LB1.

It should be noted that the state machine 70 may transition from the idle state to a state 85 whenever the sequence of read accesses to the line buffer LB1 demonstrates a likelihood of continuing in sequence. From the state 85, the state machine moves to state 73 to begin moving four doublewords of data into the line buffer LB0.

It should be noted that in one embodiment of the invention, the line buffer LB0 is the only line buffer used only for "line fetches" in which sufficient data is read to fill the remainder of line buffer LB0. In that embodiment a similar state machine exists for prefetching read data to line buffer LB0; that state machine, however, reads all four doublewords of data to line buffer LB0.

Figure 7:
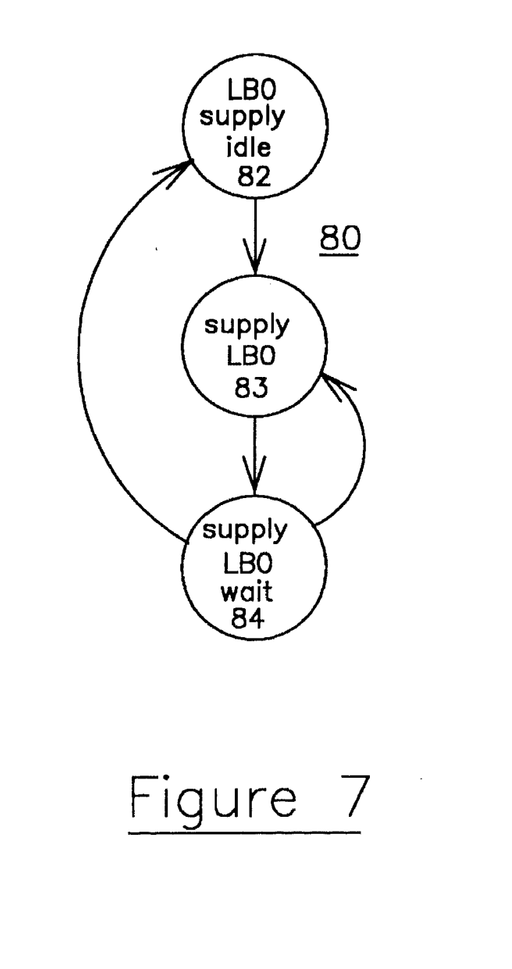
FIG. 7 is another diagram describing the operative states of a second state machine utilized in implementing the invention.

FIG. 7 is a state diagram illustrating the operation of the LB0 Supply state machine 80. The state machine 80 is used to transfer the data stored in the line buffer LB0 to the secondary bus master conducting the read of memory through the bridge 17. A similar LB1 state machine is used to transfer the data stored in the line buffer LB1 to the secondary bus master; this state machine operates in the same manner as the state machine 80 so a separate state diagram is not provided. The state machine 80 rests in an idle state 82 when there is no line buffer cycle or whenever the secondary bus master is required to wait, such as when a miss occurs when the bridge 17 starts a first read of memory. The state machine 80 moves to a state 83 when there is a line buffer cycle with a valid comparison by the address comparator and an address hit in line buffer LB0. In state 83, the state machine sends control signals to operate the line buffer LB0 so that the selected data is read from the line buffer LB0. It marks the bytes of data read as invalid and sends this indication to the address comparison circuit 58. The state machine 80 moves to a state 84 when a wait is necessary on the secondary bus and back to the state 83 when the wait is over. Finally, the state machine moves from the state 84 back to the idle state 82. This occurs whenever a change in ownership of the secondary bus occurs, whenever the bus master controlling the read operation wants to write to the PCI bus, whenever the address to be read changes to line buffer LB1, and whenever there is a read miss in both line buffers LB0 and LB1.

Figure 8:
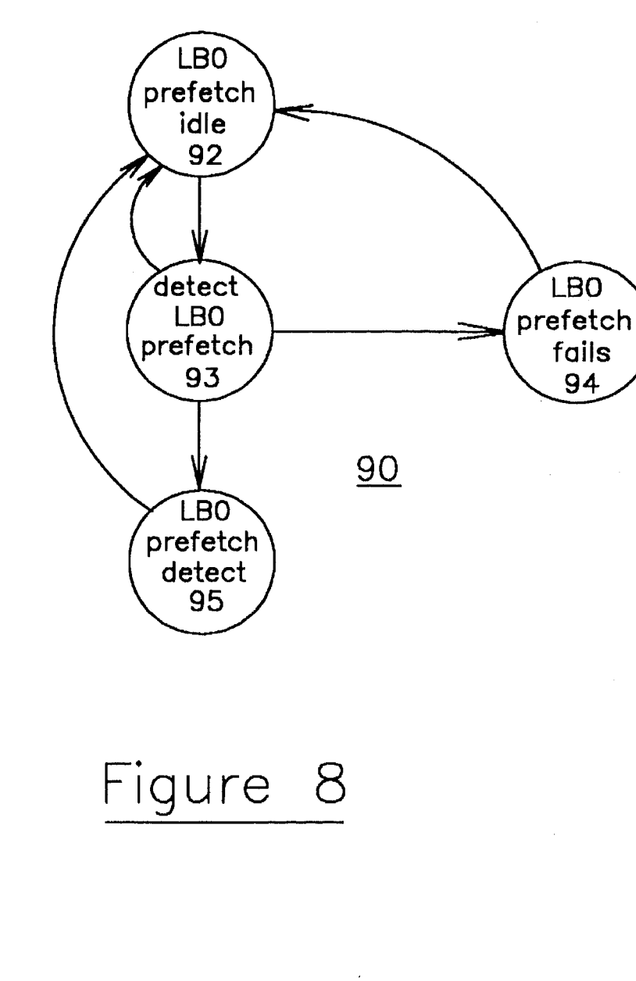
FIG. 8 is another diagram describing the operative states of a third state machine utilized in implementing the invention.

FIG. 8 is a state diagram illustrating the operation of the LB0 and LB1 Prefetch state machines 90 and 91. The state machine illustrated is state machine 90 for accomplishing prefetch by the line buffer LB0. The state machine 90 is normally in an idle state 92. The state machine 90 transitions to a detect prefetch state whenever a read of data in any of the four doubleword spaces in the line buffer LB1 is indicated by read signals asserted by the LB1 Supply state machine. In the state 93, the prefetch state machine 90 detects additional reads by the LB1 state machine. If the next doubleword read is not the next in sequence, the state machine moves to a state 94 at which a prefetch fail occurs. The state machine 90 remains in this state until an entirely new line buffer read cycle occurs. Thus, no prefetch may occur thereafter if an indication of randomness occurs at the beginning of the read of the line buffer.

The state machine 90 also moves back to the idle state 92 if the bus master decides to read data from line buffer LB0, if the line buffer cycle ends, or a line buffer write cycle occurs.

The state machine 90 transitions to a state 95 if at state 93 a sequence of reads of sequentially addressed data increments is detected. Thus, if a first read of line buffer LB1 is of the doubleword 0 at state 92 and a read of doubleword 1 occurs at state 93, the state machine 90 moves to the state 95 and signals that a prefetch of data for line buffer LB0 is indicated. Similarly, a first read of doubleword 1 followed by a read of doubleword 2, or, a first read of doubleword 2 followed by a read of doubleword 3 causes the state machine 90 to transition to state 95 and signal that a prefetch of data for line buffer LB0 is indicated. As indicated above, this causes the LB0 Read state machine 70 to move to state 85 and begin the prefetch operation.

Thus, as may be seen, the LB0 prefetch state machine 90 looks at the reads of data in the line buffer LB1 accomplished by the secondary bus master and initiates a prefetch of four complete doublewords when the reads indicate that they will occur in sequence. Similarly, the LB1 prefetch state machine 91 looks at the reads of data in the line buffer LB0 accomplished by the secondary bus master and initiates a prefetch of four complete doublewords when the reads indicate that they will occur in sequence. Thus, the line buffers LB0 and LB1 will continue to be filled with prefetched data obtained four doublewords per arbitration so long as the reads continue in sequence. This greater accelerates the operation of data reads through the bridge 17.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A bridge circuit for transferring data from a first bus to a second bus in a computer system comprising:

an address input to receive addresses of data increments to be transferred;

a first data buffer to temporarily store data increments;

a fetch circuit coupled to the address input and the first data buffer to fetch from the first bus and latch in the first data buffer at least a first data increment in response to a first address received on the address input; and a sequence detection circuit coupled to the address input to detect sequential addresses, the sequence detection circuit causing the fetch circuit to prefetch a first plurality of data increments in response to detecting sequential addresses on the address input.

2. The bridge circuit as set forth in claim 1 further including a second data buffer coupled to the fetch circuit to temporarily store data increments, wherein the fetch circuit further latches the first plurality of data increments in the second data buffer.

3. The bridge circuit as set forth in claim 2 further including first and second address buffers coupled to the first and second data buffers respectively, the first and second address buffers to store a predetermined number of most significant bits of an address of a data increment stored in the corresponding data buffer.

4. The bridge circuit as set forth in claim 3 further including an address comparator coupled to the first and second address buffers and the address input to compare an address received on the address input to the predetermined number of most significant bits stored in the first address buffer to determine whether a data increment to be transferred is latched in the first data buffer and to the predetermined number of most significant bits stored in the second address buffer to determine whether a data increment to be transferred is latched in the second data buffer.

5. The bridge circuit as set forth in claim 4 further including a supply circuit coupled to the address comparator to supply a data increment determined to be temporarily stored in the first or second data buffer to the second bus in response to receiving the address of the data increment on the address input.

6. The bridge circuit as set forth in claim 5 wherein the detection circuit further causes the fetch circuit to prefetch a second plurality of data increments sequentially following the first plurality of data increments in address order in response to detecting sequential addresses corresponding to the first plurality of data increments on the address input.

7. The bridge circuit as set forth in claim 1 wherein the first bus is a PCI bus.

8. The bridge circuit as set forth in claim 1 wherein the second bus is an EISA bus.

9. The bridge circuit as set forth in claim 1 further including:

a control input coupled to the address input and the fetch circuit to receive a request to transfer data increments from the first bus to the second bus; and an arbitration circuit coupled to the address input and the first bus to arbitrate for and maintain control of the first bus in response to a transfer request while the fetch circuit fetches the first plurality of data increments such that the plurality of data increments is fetched following a single arbitration operation.

10. A method for efficiently transferring data increments from a first bus to a second bus in a computer system, the method comprising the steps of:

receiving addresses of data increments to be transferred from the first bus to the second bus on an address input including a first address of a first data increment;

fetching at least the first data increment from the first bus;

latching at least the first data increment in a first data buffer;

determining whether a next address received on the address input sequentially follows the first address in address order; and prefetching a first plurality of data increments from the first bus if the first address and the next address are sequential.

11. The method as set forth in claim 10 further including the step of latching the first plurality of data increments in a second data buffer.

12. The method as set forth in claim 11 further including the steps of:

latching in a first address buffer a predetermined number of most significant bits of an address of the first data increment stored in the first data buffer; and comparing addresses received on the address input with the most significant bits stored in the first address buffer to determine if a requested data increment is latched in the first data buffer.

13. The method as set forth in claim 12 further including the steps of:

latching in a second address buffer the predetermined number of most significant bits of an address of the first plurality of data increments temporarily stored in the second data buffer; and comparing addresses received on the address input with the most significant bits stored in the second address buffer to determine if a requested data increment is latched in the second data buffer.

14. The method as set forth in claim 13 further including a step of supplying a data increment temporarily stored in the first or second data buffer to the second bus in response to receiving the address of the data increment on the address input.

15. The method as set forth in claim 13 further including the steps of:

determining whether addresses of the first plurality of data increments temporarily stored in the second data buffer are received sequentially on the address input;

prefetching from the first bus a second plurality of data increments sequentially following the first plurality of data increments in address order responsive to determining that addresses of the first plurality of data increments are received sequentially; and latching the second plurality of data increments in the first data buffer.

16. The method as set forth in claim 10 further including the steps of:

prior to the prefetching step, arbitrating for control of the first bus; and maintaining control of the first bus during the prefetching step such that the first plurality of data is prefetched following a single arbitration operation.

17. The method as set forth in claim 10 further including a step of asserting and maintaining control of the first bus during the step of prefetching.

18. The method as set forth in claim 10 wherein the determining step comprises the step of comparing the next address received on the address input to the first address.

19. An apparatus for transferring data from a first bus to a second bus in a computer system, the apparatus comprising:

input means for receiving addresses of data increments to be transferred from the first bus to the second bus;

a first data store for temporarily storing data increments from the first bus;

means for fetching from the first bus and latching in the first data store at least a first data increment, the means for fetching being coupled to the input means and the first data store; and means coupled to the input means for detecting sequential addresses received on the input means, the detecting means causing the fetching means to prefetch a first plurality of sequentially addressed data increments in response to detecting sequential addresses on the input means.

20. The apparatus as set forth in claim 19 further including a second data store coupled to the input means for temporarily storing data increments, wherein the fetching means further latches the first plurality of data increments in the second data store.

21. The apparatus as set forth in claim 20 further including means for supplying a particular data increment stored in the first or second data store to the second bus in response to receiving the address of the particular data increment on the input means, wherein the detecting means further determines whether at least a first two addresses of the first plurality of data increments stored in the second data store are sequentially received on the address input, and wherein the fetching means is responsive to the detecting means to prefetch a second plurality of data increments sequentially following the first plurality of data increments in address order if at least the first two addresses of the first plurality of data increments are sequentially received on the address input.

22. A computer system comprising:

a memory coupled to a first bus;

a processor coupled to the first bus;

a bus master coupled to a second bus;

an address input coupled to the second bus to receive addresses of data increments to be transferred from the memory to the bus master;

a first data buffer to temporarily store data increments;

a fetch circuit coupled to the first bus and the first data buffer to fetch from the memory on the first bus and latch in the first data buffer at least a first data increment; and a detection circuit coupled to the address input to detect sequential addresses, the detection circuit causing the fetch circuit to prefetch a first plurality of sequentially addressed data increments in response to detecting sequential addresses on the address input.

23. The computer system as set forth in claim 22 further including a second data buffer coupled to the fetch circuit to temporarily store data increments, wherein the fetch circuit further latches the first plurality of data increments in the second data buffer.

24. The computer system as set forth in claim 23 further including a supply circuit to supply a particular data increment stored in the first or second data buffer to the second bus in response to receiving the address of the particular data increment on the address input, wherein the detection circuit further determines whether at least a first two addresses of the first plurality of data increments stored in the second data store are sequentially received on the address input and causes the fetch circuit to fetch a second plurality of data increments sequentially following the first plurality of data increments in address order if the at least first two addresses of the data increments stored in the second data store are sequentially received.

25. The computer system as set forth in claim 24 wherein the fetch circuit is further responsive to the detection circuit to abort prefetching of the second plurality of data increments if the detection circuit determines that the addresses corresponding to the first plurality of data increments are not received successively on the address input in sequential order.

26. The computer system as set forth in claim 22 wherein the first bus is a PCI bus.

27. The computer system as set forth in claim 22 wherein the second bus is an EISA bus.

28. The computer system as set forth in claim 22 further including an arbitration circuit coupled to the address input and the first bus to arbitrate for and maintain control of the first bus while the fetch circuit prefetches the first plurality of data increment such that the first plurality of data increments is prefetches following a single arbitration operation.

* * * * *